UNITED STATES PATENT OFFICE.

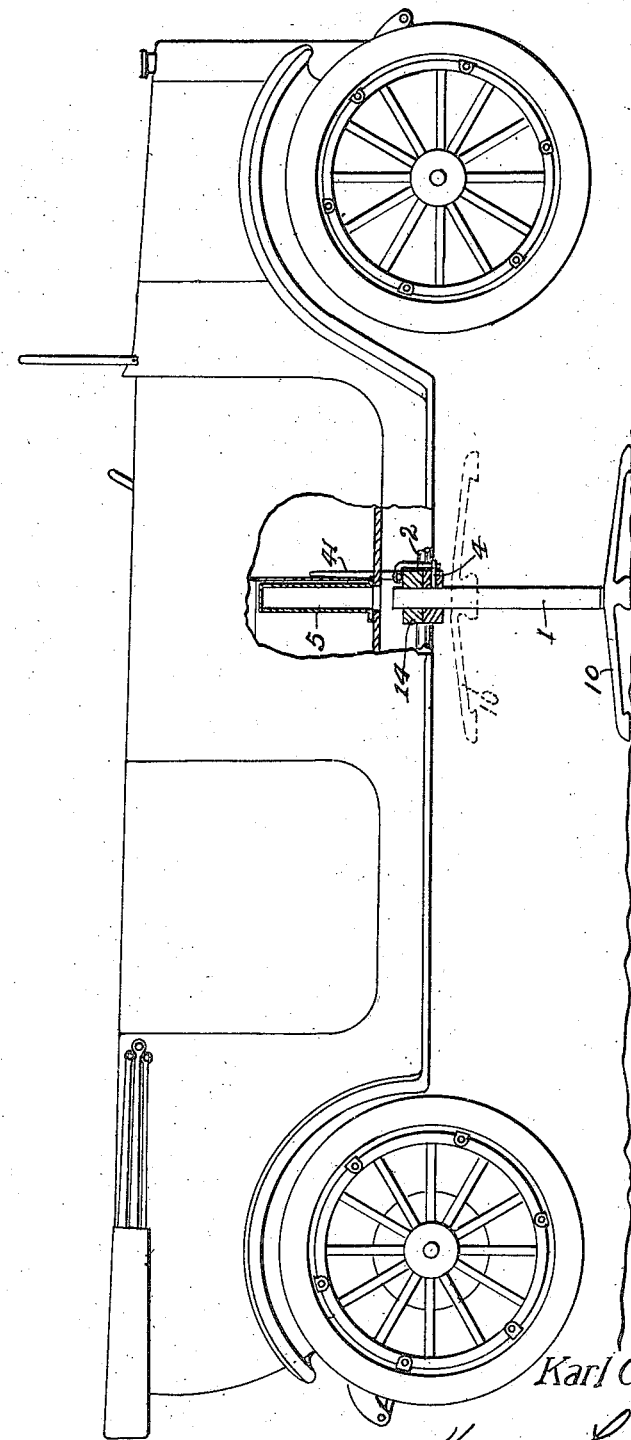

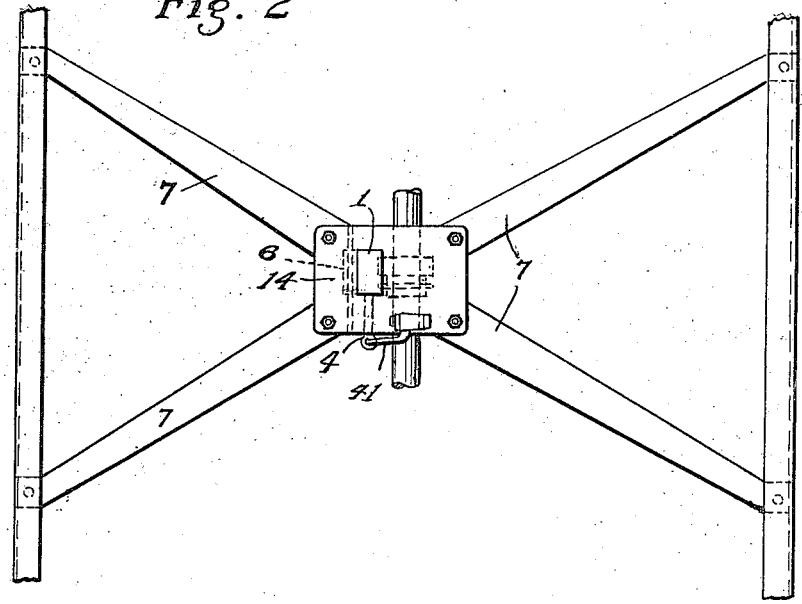
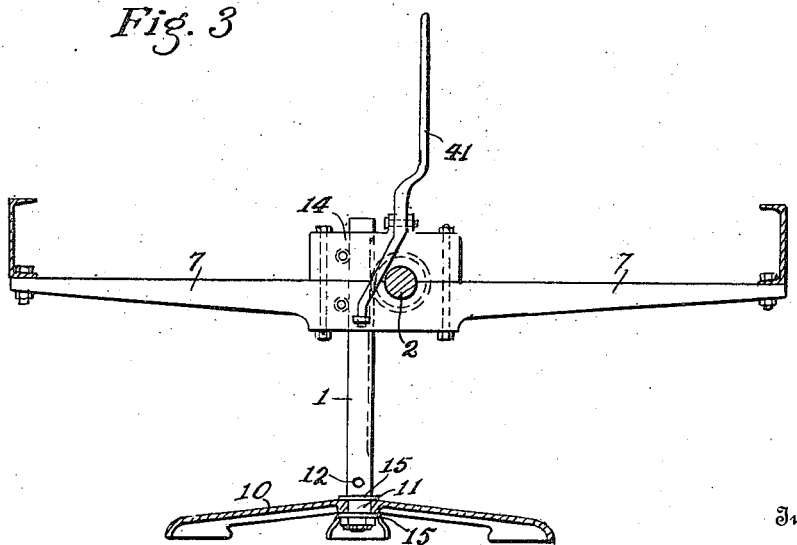

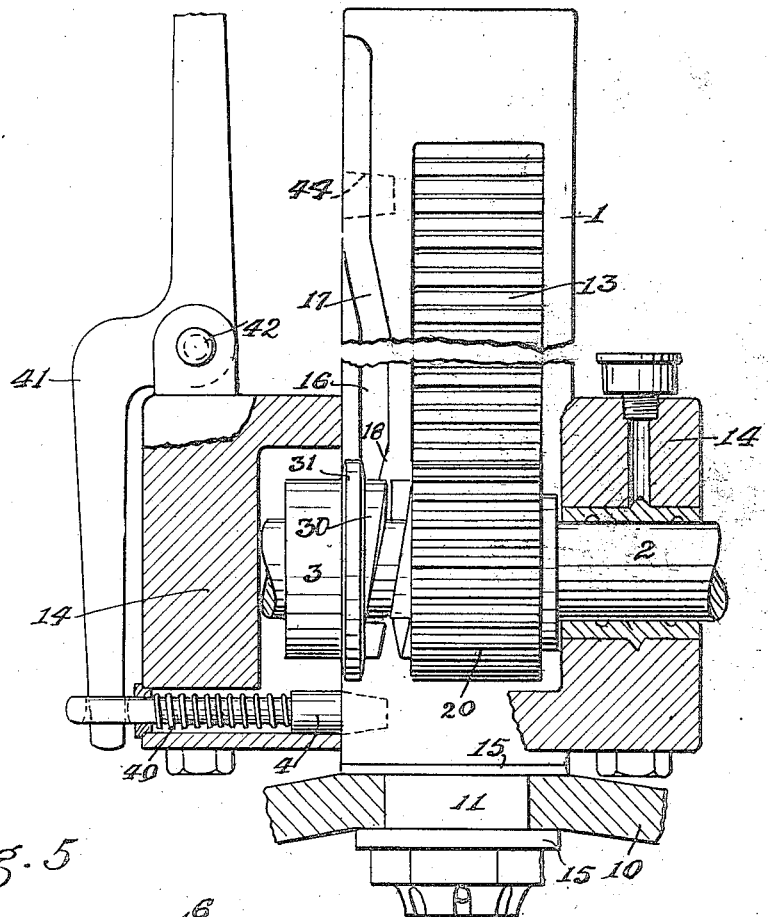

KARL G. ANDERSON, OF SEATTLE, WASHINGTON.

AUTOMOBILE-JACK.

1,323,997. Specification of Letters Patent. Patented Dec. 2, 1919.

Application filed November 27, 1918. Serial No. 264,295.

*To all whom it may concern:*

Be it known that I, KARL G. ANDERSON, a subject of the King of Sweden, who has taken out his first papers as a United States citizen, and resident of the city of Seattle, county of King, and State of Washington, have invented certain new and useful Improvements in Automobile-Jacks, of which the following is a specification.

My invention relates to automobiles and consists of a device intended for permanent mounting upon an automobile and operable as a jack to raise the automobile bodily when desired.

The object of my invention is to provide a device which shall be installed as a permanent part of the automobile and at all times available for use as a jack, and with this to provide means whereby the device may be actuated through the power of the automobile engine to raise the automobile.

The features of novelty and those upon which patent protection are desired, will be herein described and then particularly defined by the claim. The drawings show the preferred form of construction.

Figure 1 is a side view of an automobile, having my invention applied thereto, the parts being shown in full lines in position where the automobile has been raised by the action of the jack.

Fig. 2 is a plan view of the frame members upon which the device is supported.

Fig. 3 is an elevation of the same parts, taken on the plane extending transversely of the automobile.

Fig. 4 is a section through the operating parts of the jack showing the stem of the jack and the pinion by which the same is operated, in elevation.

Fig. 5 is a section taken through the frame parts of this device, at the level of the pinion.

It is the purpose of this device to provide means which shall be permanently installed upon the automobile, in position for use at any time, whereby, whenever circumstances make such action desirable, the automobile may, as a whole, be elevated from the ground. Such action may be desirable in many cases, such for instance, as when the automobile, or certain wheels thereof, get into soft ground and sink so that it is difficult to obtain traction, or to make progress.

To secure the results desired I have installed a jack which is normally carried in elevated position, under the center of gravity of the automobile. Such jack is provided with a wide base, which, when its stem is forced downward, will engage the ground, and by applying power thereto, the automobile may be raised as a whole.

The jack members proper consist of a stem 1, a foot 10, secured to the lower end of said stem, and means whereby said stem may be positively raised or lowered, as desired. The stem 1 is herein shown as being of rectangular cross section. This is mounted to slide in suitable guides carried by the automobile frame. Such guides are shown at 14. Rollers 6 may be used to lessen friction.

The stem 1 has rack teeth 13 on one side thereof, which teeth mesh with a pinion 20 carried by a shaft 2. This shaft 2 would ordinarily be the shaft connecting the engine with the driving wheels of the automobile. It may, however, be any other shaft which is found suitable for this purpose. It is evident that with a device of this kind, if the pinion 20 be turned, the stem 1 of the jack will be raised or lowered, depending upon the direction of rotation of this pinion.

When the stem is forced downward, the foot or base 10, upon contact with the ground, will prevent further movement excepting through an upward movement of the car. In consequence, the car may be lifted bodily, as shown in Fig. 1. This may be desirable at many times, and particularly in cases where any of the driving wheels of the car have gotten into a mud hole, or soft ground of any kind, and it is impossible to obtain sufficient traction to force the car out under its own power.

In such cases, by lifting the car it will be easily possible to fill in material under the wheel so that it may then have a surface upon which it can act, or by lifting the car and swinging it to one side, which may be done by having the lower end of the stem 1 mounted in the foot in such a manner that it may turn, the car wheels may then be placed upon solid ground and the car be enabled to proceed under its own power.

To enable this to be done the section 11, which passes through the body of the foot 10, should be made round and collars 15 be secured to the stem 1, to thereby permit turning and transmit the lifting action of the stem to the foot.

The pinion 20 is loosely mounted upon the shaft 2. Upon one face it has clutch teeth 21. Secured upon the shaft 2, so that it will turn therewith, and also so that it may have a limited reciprocal movement lengthwise of the shaft, is a complemental clutch member 3. This complemental clutch member has clutch teeth 30, which are complemental to the teeth 21 of the pinion, so that, when the sliding clutch member 3 is moved toward the pinion 20, the pinion will be locked so as to turn with the shaft.

The stem 1 has upon the same face with the rack teeth 13, a groove 16. This groove, throughout the major part of its length, is parallel with the rack teeth 13. At its upper end, however, it has an inclined section 17, which shifts the body of the groove so that its outer wall is eliminated, the groove then opening freely to the side edge of the stem 1. The same condition, namely, the cutting away of the outer side wall of the groove so as to make it freely open, exists at the lower end of its travel.

The clutch member 3 is also provided with a peripheral flange 31 which is adapted to fit in the groove 16 so that throughout that portion of the movement of the stem when the flange 31 is in the groove 16, the clutch member and the pinion 20 are locked together. However, they may be separated at the uppermost and lowermost positions of the stem 1.

Mounted in the frame member 14, which has therein the guide for the stem 1, is a locking pin 4. This pin is normally held toward the stem 1 of the jack by means of a spring 40 and is manually controlled through a lever 41, which is pivoted at 42 and which extends upwardly to a point within the automobile where it may be controlled by the driver.

The stem 1 has two holes, 44, formed, respectively in its upper and lower portions, in such position that the locking pin 4 will enter therein so as to lock the stem of the jack against vertical movement in these two positions. The position of the jack shown in Fig. 4 is that which it occupies when not in use. This position is also indicated in Fig. 1 by the dotted-line position of the foot 10.

In this position the locking bolt 4 enters the lowermost of the two holes 44 in the stem 1. When the jack has been forced downward, by the application of power thereto, the pin 4 would enter the uppermost of these holes 44 and thus hold the jack in its lowered position until this pin is withdrawn. The position of the uppermost of these holes is such that the locking pin will engage therewith coincidently with the separation of the clutch member 31 from the pinion 20 through the action of the incline 17 of the groove in the face of the stem.

Therefore, when, through the application of power to the pinion 20, the car has been raised to this point, the connection of the power with the pinion is automatically broken and at the same time, the locking pin 4 enters the uppermost of these holes to retain the car in its raised position. When it is desired to lower the car, it is only necessary to pull the pin 4 out and let the car drop. As the car would never be any great distance off the ground this slight drop would do no harm.

The engagement of the clutch member 3 with the pinion is controlled manually by means of a lever. This lever and the manner of connecting it with the clutch member 3, may be of any suitable type of construction. It may be made to engage with the flange 31 so as to move the clutch member upon the shaft. After this clutch member has been engaged with the pinion 20, it is held in this position by the engagement of the flange 31 with the groove 16.

I have shown a casing 5 extending upwardly from the floor of the automobile, of such a size, and so positioned as to receive the upper end of the stem 1 when the jack is raised. This will protect the stem 1 and prevent any damage due to engagement therewith by the operators or passengers in the car and any injury which might be caused thereby.

With this kind of a device it is possible for the driver of an automobile to raise the same sufficiently to answer most purposes, using the power of the engine to do this. It is also possible, after the automobile has been raised, to swing the same upon the jack as a pivot center and thus to often transfer the wheels from a soft spot from which it is impossible to drive it under its own power, to a spot where it will have sufficiently solid support to get good traction and thus to enable it to extract itself. Even when this is not possible, it will enable the raising of the automobile so that filling under the wheel which has become mired, is easily possible.

What I claim as my invention is:

An automobile jack comprising a foot, a stem connected with the foot and having rack teeth thereon, a guide for the stem carried centrally by the automobile, a pinion loosely mounted on the engine shaft and meshing with said rack, said pinion having a clutch face, a clutch member turned by and slidable upon the engine shaft to engage and turn said pinion, the rack bar having a cam groove in its face alongside of the rack teeth and the clutch member having a rib entering said groove and acting to disengage the clutch when the automobile is raised.

Signed at Seattle, Washington, this 19th day of November, 1918.

KARL G. ANDERSON.